United States Patent
Choi et al.

(10) Patent No.: US 9,796,372 B2
(45) Date of Patent: Oct. 24, 2017

(54) POWERTRAIN AND CONTROL METHOD WITH SELECTIVE PURSUIT OF OPTIMAL TORQUE TARGETS

(71) Applicant: GM GLOBAL TECHNOLOGY OPERATIONS LLC, Detroit, MI (US)

(72) Inventors: Tayoung Choi, Novi, MI (US); Krunal P Patel, Sterling Heights, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 14/925,492

(22) Filed: Oct. 28, 2015

(65) Prior Publication Data
US 2017/0120889 A1 May 4, 2017

(51) Int. Cl.
| | |
|---|---|
| G06F 19/00 | (2011.01) |
| B60W 20/10 | (2016.01) |
| B60L 11/18 | (2006.01) |
| B60L 15/20 | (2006.01) |
| B60W 30/188 | (2012.01) |
| F02B 37/12 | (2006.01) |
| F02D 17/02 | (2006.01) |
| B60W 10/06 | (2006.01) |

(Continued)

(52) U.S. Cl.
CPC .......... B60W 20/10 (2013.01); B60L 11/1851 (2013.01); B60L 15/2045 (2013.01); B60W 10/06 (2013.01); B60W 10/08 (2013.01); B60W 10/26 (2013.01); B60W 30/188 (2013.01); F02B 37/12 (2013.01); F02D 11/105 (2013.01); F02D 17/02 (2013.01); F02D 41/0087 (2013.01); B60W 2050/0024 (2013.01); B60W 2510/0633 (2013.01); B60Y 2300/435 (2013.01); B60Y 2400/435 (2013.01); F02D 41/0007 (2013.01); F02D 2250/21 (2013.01)

(58) Field of Classification Search
CPC . B60W 20/10; B60W 30/188; B60L 11/1851; B60L 15/2045; F02B 37/12; F02D 17/02
USPC ...................................... 701/1, 22
See application file for complete search history.

(56) References Cited

U.S. PATENT DOCUMENTS

| 8,583,306 B2 | 11/2013 | Arnett et al. |
| 9,242,641 B2 * | 1/2016 | Martin .................. B60W 20/15 |

(Continued)

*Primary Examiner* — Ronnie Mancho
(74) *Attorney, Agent, or Firm* — Quinn IP Law (57) ABSTRACT

A method for controlling a powertrain of a vehicle includes calculating, via a controller, an optimal torque target for the powertrain as a function of system limits of the vehicle. The method includes commanding, via transmission of an output torque signal, an actual output torque of the powertrain to pursue or follow the calculated optimal torque target during a steady-state torque request condition. Additionally, the method includes detecting a predetermined vehicle event during the steady-state torque request condition, and shaping the output torque signal via the controller. A variable gain factor may be used in response to detection of the predetermined vehicle event to allow the output torque signal to temporarily deviate from the calculated optimal torque target during the steady-state torque request condition. A powertrain has an engine, an electric machine, and a controller programmed to execute the method.

16 Claims, 4 Drawing Sheets

(51) Int. Cl.
  *B60W 10/08*   (2006.01)
  *B60W 10/26*   (2006.01)
  *F02D 41/00*   (2006.01)
  *F02D 11/10*   (2006.01)
  *B60W 50/00*   (2006.01)

(56) References Cited

U.S. PATENT DOCUMENTS

| | | | |
|---|---|---|---|
| 9,327,707 B2* | 5/2016 | Hawkins | B60W 10/06 |
| 2014/0349807 A1* | 11/2014 | Heap | B60W 20/10 |
| | | | 477/3 |
| 2015/0369140 A1* | 12/2015 | Wagh | F02D 17/02 |
| | | | 701/102 |
| 2016/0146130 A1* | 5/2016 | Haskara | F02D 41/005 |
| | | | 701/108 |

* cited by examiner

POWERTRAIN AND CONTROL METHOD WITH SELECTIVE PURSUIT OF OPTIMAL TORQUE TARGETS

TECHNICAL FIELD

The present disclosure relates to a vehicle powertrain and control method with selective pursuit of optimal torque targets.

BACKGROUND

Automotive vehicles deliver input torque to a transmission from one or more torque sources, typically an engine and/or one or more electric machines. The level of input torque is based on a torque request as applied by a driver to an accelerator pedal. Transmission output torque is transmitted at a controlled level to drive axles of the vehicle. When the torque request remains unchanged for an extended period of time, a powertrain controller can assume that the powertrain is providing sufficient output torque. Control actions may be executed by the controller under such conditions, such as selective cylinder deactivation, in order to optimize overall fuel economy. In this mode, instead of following the driver's torque request, the controller can command that transmission output torque instead pursues a calculated optimal output torque target.

In a hybrid powertrain in particular, a high-voltage battery energizes the electric machine(s) for the purpose of motor torque generation. The motor torque can be used to propel the vehicle in electric powertrain mode, or to assist input torque from the engine. The state-of-charge, electrical current, and individual cell voltages of the battery may be monitored over time against allowable maximum and minimum battery power limits. Commanded output torque may be automatically determined by evaluating the driver torque request against such battery power limits, as well as limits on engine torque, motor torque, clutch torque, and/or other powertrain constraints. Available power from the energy storage system may be converted into an optimal output torque or crankshaft torque, which may be used as a target in open-loop control logic. A similar approach may be used for conventional powertrains that forgo the energy storage system and the electric machines noted above.

SUMMARY

A powertrain and method are disclosed herein for selectively pursuing a calculated optimal torque target during a predetermined vehicle event, e.g., a fuel economy event such as selective cylinder deactivation, activation or deactivation of a turbocharger, changes in accessory power loads such as air conditioning or cabin heaters, and the like. When a powertrain is operating under steady-state driver torque request conditions, for instance as determined via a quiescence timer and accelerator pedal position or travel, a controller may selectively command execution of a fuel economy (FE) mode. In such an FE mode, rather than following the driver's torque request, the controller instead allows a commanded output torque to follow a calculated optimal torque value. Such a value, when used in an electrified powertrain, may be determined as a function of optimal battery power. Other system limits such as available engine power may be used in conventional vehicles within the intended inventive scope.

It is recognized herein as a basis for the disclosed method that an optimal torque target can move dynamically during any of the predetermined vehicle events noted above. Therefore, during such an event, even though a driver's torque request remains unchanging or steady-state, the pursuit of the calculated optimal torque target by the commanded output torque, i.e., the attempted matching of the calculated optimal torque target in open-loop control logic, may result in driveline disturbances. Likewise, a light tip-in or tip-out of throttle or other torque request while the predetermined vehicle event remains ongoing can cause similar results. Therefore, the present approach is intended to provide a control methodology that helps prevent the dynamic movement of commanded output torque, especially in a direction opposite that of the driver's torque request.

In a particular embodiment, a method for controlling a powertrain of a vehicle includes calculating, via a controller, an optimal torque target for the powertrain as a function of predetermined limits of the vehicle. The method further includes commanding, via transmission of a commanded output torque signal, that an actual output torque of the powertrain follow the calculated optimal torque target during a steady-state torque request condition. Additionally, a predetermined vehicle event is detected during the steady-state torque request condition. The commanded output torque signal is shaped using a variable gain factor in response to detection of the predetermined vehicle event. This allows the commanded output torque signal, and thus the actual output torque, to temporarily deviate from the optimal torque target.

A powertrain is also disclosed herein that includes, in an embodiment, an electric machine, an energy storage system, and a controller. The energy storage system is electrically connected to the electric machine and has a calibrated electrical power limit. The controller is in communication with the electric machine, and is programmed to calculate an optimal torque target for the powertrain as a function of system limits of the powertrain. The system limits include the calibrated electrical power limit. The controller also commands, via transmission of an output torque signal, that an actual output torque of the powertrain to pursue or follow the calculated optimal torque target during a steady-state torque request condition. Additionally, the controller is programmed to detect a predetermined vehicle event during the steady-state torque request condition, and to shape the output torque signal using a variable gain factor in response to detection of the predetermined vehicle event. This action allows the output torque signal to temporarily deviate from the calculated optimal torque target during the steady-state torque request condition. Other embodiments may have conventional powertrains using an engine as the sole torque generating device.

The above and other features and advantages of the present disclosure are readily apparent from the following detailed description of the best modes for carrying out the disclosure when taken in connection with the accompanying drawings.

DETAILED DESCRIPTION

Figure 1:
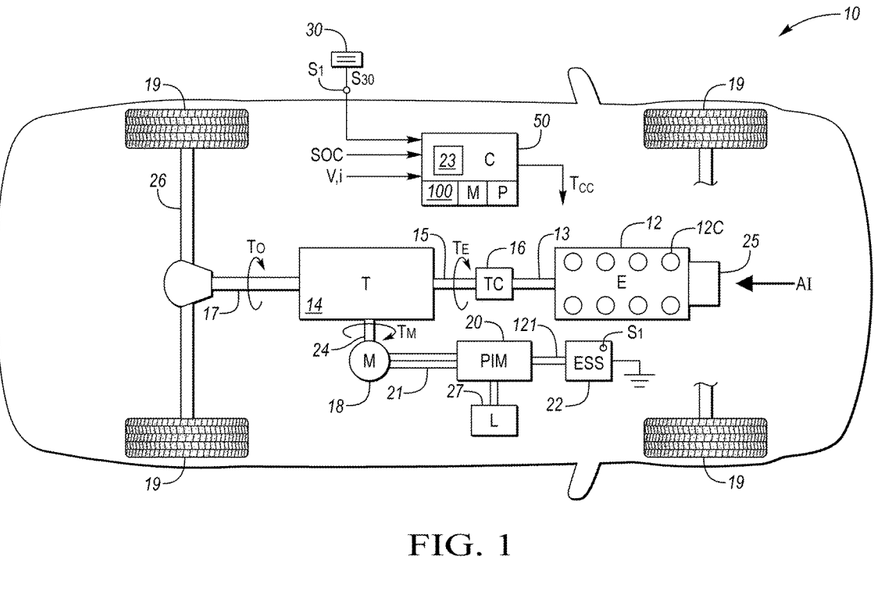
FIG. 1 is a schematic illustration of an example vehicle having a powertrain and a controller programmed to control the powertrain during a predetermined vehicle event as set forth herein.

Referring to the drawings, wherein like reference numerals are used to identify like or identical components in the various views, an example vehicle 10 having a powertrain 11 is shown schematically in FIG. 1. The powertrain 11 includes one or more torque sources, e.g., an internal combustion engine (E) 12 and/or one or more electric machines (M1) 18 as shown, with the electric machine 18 energized via a battery portion of an energy storage system (ESS). The engine 12 and electric machine 18 in the depicted example embodiment generate and deliver input torque to a transmission (T) 14 in response to a torque request (arrow TR) from a driver. A controller (C) 50 calculates a torque request (trace TR of FIGS. 2 and 3) as a function of a measured force, travel, or position of a pedal signal (arrow $S_{30}$) from an accelerator pedal 30. The controller 50 then executes a method 100 for controlling the powertrain in a selective manner according to a calculated optimal torque target in the manner set forth below with reference to FIGS. 2-4, with the calculated optimal torque target depicted in FIGS. 2 and 3 as trace $T_{OT}$.

In general terms, the optimal torque target for the powertrain 11 of FIG. 1 is calculated by the controller 50 as a function of predetermined limits of the vehicle 10, such as calculated electrical power limits of an energy storage system (ESS) 22 of the vehicle 10 and/or power or torque limits of the engine 12 and/or electric machine(s) 18. The controller 50 commands, via an output torque signal (arrow $T_{CC}$), that an actual output torque (arrow $T_O$) of the powertrain 11 pursues or follows the calculated optimal torque target during steady-state torque request conditions, i.e., when a driver-requested torque does not vary over a calibrated duration. Additionally, when a predetermined vehicle event is detected during the steady-state torque request condition, the controller 50 automatically shapes the output torque signal (arrow $T_{CC}$) using a variable gain factor K1, shown in FIGS. 2 and 3, so as to allow the output torque signal (arrow $T_{CC}$), and therefore the actual output torque (arrow $T_O$), to temporarily deviate from the calculated optimal torque target.

Suitable predetermined vehicle events within the intended inventive scope may include any onboard event that changes the torque capacity of the engine 12 or electric machine 18, which in turn can change optimal battery power in an embodiment in which the powertrain 11 is electrified, i.e., uses energy from the energy storage system 22 to power the electric machine 18 as a torque generator. As the calculated optimal torque target is a function of converted optimal battery power in any electric versions of the powertrain 11, a continued pursuit of the calculated optimal torque target during the predetermined vehicle event may produce undesirable noise, vibration, and harshness in the powertrain 11. Example predetermined vehicle events include selective cylinder deactivation, activation or deactivation of a turbocharger 25, and changes in accessory power loads (L) 27 such as air conditioning or cabin heaters.

The example vehicle 10 of FIG. 1 may include a hydrodynamic torque converter (TC) 16 or a clutch and damper assembly located between a crankshaft 13 of the engine 12 and an input member 15 of the transmission 14. Engine torque (arrow $T_E$) thus contributes at least part of the total input torque to the transmission 14. In some designs, the electric machine(s) 18 may be used to generate and deliver motor torque (arrow $T_M$) to the transmission 14 via a rotor shaft 24, anywhere between the crankshaft 13 and an output member 17. Additional electric machines (not shown) may be used alone or in conjunction with the engine 12 in other embodiments, or the engine 12 may be used without any additional torque sources. The output member 17 ultimately delivers output torque (arrow $T_O$) to one or more drive axles 26, and thus to drive wheels 19 of the vehicle 10.

Embodiments using a high-voltage energy storage system 22 may connect the energy storage system 22 to the electric machine 18 via a power inverter module (PIM) 20 by way of an alternating current (AC) voltage bus 21, with the PIM 20 connected to the energy storage system 22 via a direct current (DC) voltage bus 121. A state of charge (arrow SOC) of the energy storage system 22, and/or a voltage (arrow V) or current (arrow i) of the energy storage system 22, may be received by the controller 50 as inputs to the method 100.

The optional turbocharger 25 may be embodied as a centrifugal gas compressor that forces intake air (arrow AI) into the engine 12. The additional mass of oxygen-containing air improves volumetric efficiency of the engine 12, allowing the engine 12 to burn more fuel in a given compression cycle, and to thereby produce more power, as is well known in the art. The engine 12 includes cylinders 12C that, in an Active Fuel Management (AFM) mode, may be selectively deactivated by the controller 50 to conserve fuel. The vehicle 10 also includes accessory power loads 27, such as an air conditioning unit, defroster, or cabin heater, which when turned on can add a substantial power load, thus affecting the calculation of any optimal torque targets used in the method 100. Therefore, as explained below, the AFM mode and accessory power cycling are two possible examples of the predetermined vehicle event of the present method 100.

The controller 50 shown in FIG. 1 may be embodied as one or more digital computers having sufficient memory (M) and a processor (P), in communication with sensors operable for measuring, detecting, or calculating a required input value to the controller. For instance, a sensor S1 may measure a pedal position of the accelerator pedal 30, while electrical sensors S2 in the energy storage system 22 may be used to measure electrical properties of the energy storage system 22 such as state of charge (arrow SOC), voltage (V), and current (i). The memory (M) is programmed with instructions for executing the method 100. Memory (M) includes tangible, non-transitory memory devices or media such as read only memory, random access memory, optical memory, flash memory, electrically-programmable read-only memory, a timer 23, and a torque limit module. The commanded output torque signals (arrow $T_{CC}$) ultimately command a particular amount of torque contribution from one of the available torque sources, in this instance the engine 12 and electric machine 18.

As part of the present method 100, the timer 23 may be used to help determine whether a driver-requested torque is sufficiently steady-state, i.e., unchanging or stable over a calibrated duration. The timer 23 may be a quiescence timer. Such a quiescence timer may be used to initiate a fuel economy (FE) mode in which a powertrain, such as the powertrain 11 of FIG. 1, is controlled according to a fuel-saving calculated optimal output torque target instead of following a driver's requested torque. The optimal output torque target is usually calculated as a function of optimal battery power. Battery power in turn is converted to the optimal output torque target, with the commanded output torque target (arrow $T_{CC}$) transmitted to the powertrain 11, including the mix of torque sources that are used, determined in a manner that conserves fuel. The method 100 disclosed herein is intended to prevent dynamic movement of the actual output torque (arrow $T_O$), especially in a direction opposite to the driver's requested torque, by closely monitoring relativity of the driver's torque request and previous values of the calculated output torque signal (arrow $T_{CC}$).

Figure 2:
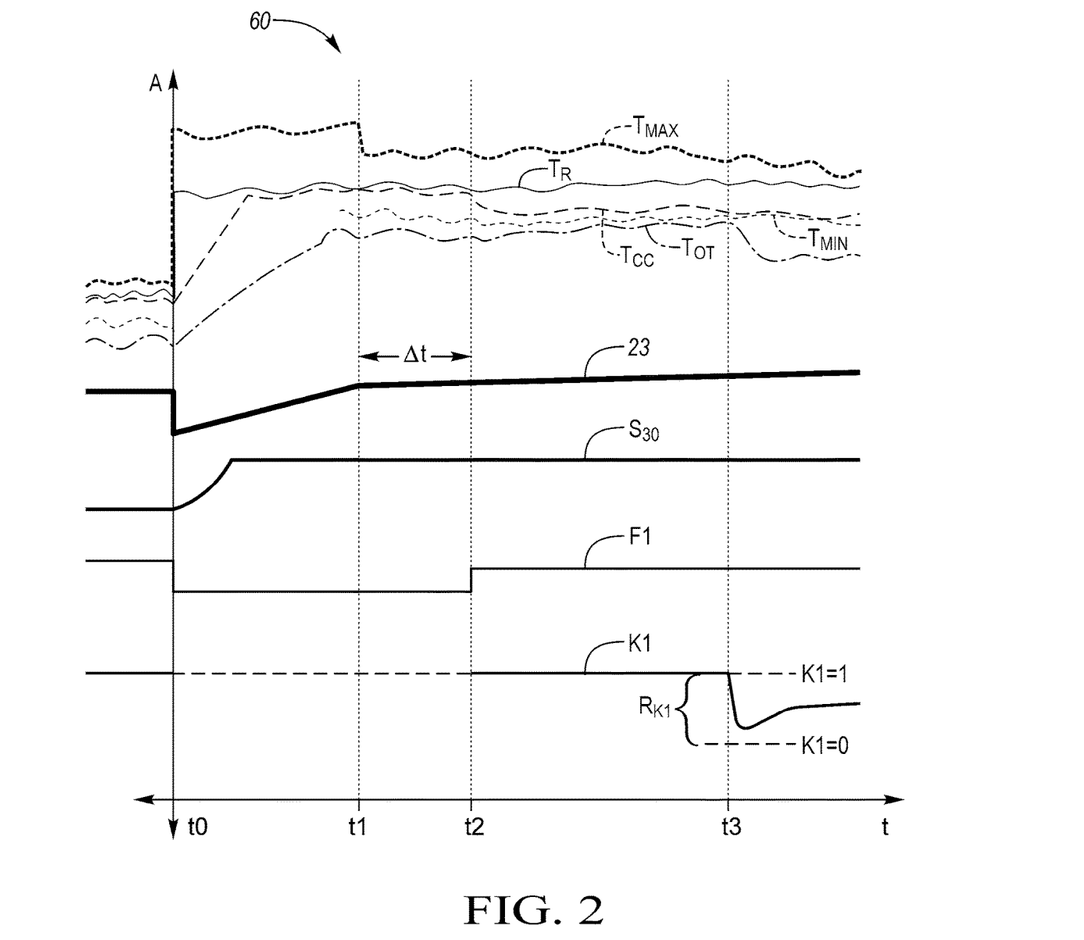
FIG. 2 is a time plot of vehicle parameters used in the control of the powertrain shown in FIG. 1, with amplitude depicted on the vertical axis and time depicted on the horizontal axis.
Figure 3:
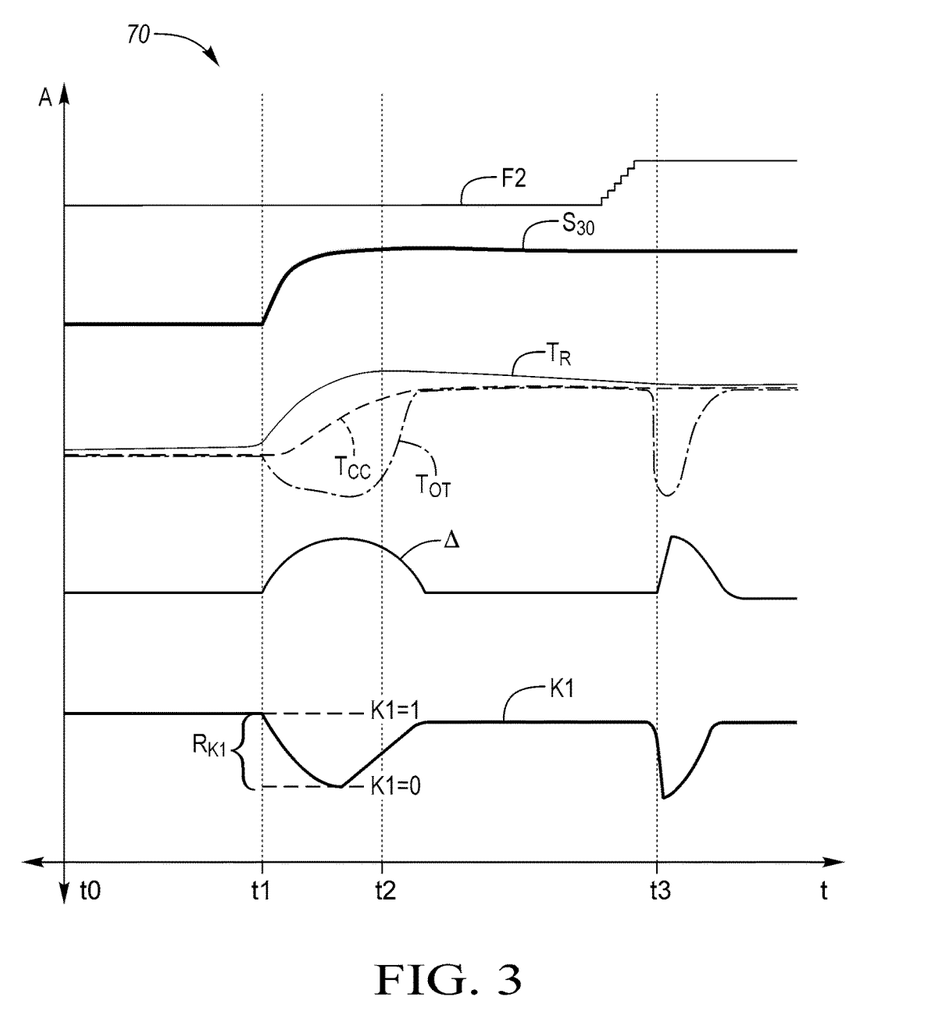
FIG. 3 is another time plot of vehicle parameters used in the control of the powertrain shown in FIG. 1.

FIGS. 2 and 3 depict example time plots of vehicle parameters used in the control of the powertrain 11 shown in FIG. 1, and commencing at t0, with amplitude (A) depicted on the vertical axis and time (t) depicted on the horizontal axis. FIG. 2 describes an example case of a sudden tip-in of torque request at t1, with traces $T_{MAX}$ and $T_{MIN}$ illustrating respective upper and lower torque limits for the powertrain 11. Trace TR represents the raw torque request from a driver of the vehicle 10, with the torque request increasing with the increase at t1 in accelerator pedal request (trace $S_{30}$).

At t1, the timer 23 starts anew, increasing at a calibrated rate and then counting through a calibrated duration (Δt) while torque request (TR) returns to and remains at a steady-state. After the timer 23 increases by a threshold amount and remains there for the calibrated duration (Δt), the fuel economy mode is enabled, as indicated by trace F1 at t2. The fuel economy mode may be enabled when other required conditions are satisfied, e.g., pedal angle, transmission state, the driveline not being in a lash state, vehicle speed, etc. In an embodiment, the fuel economy mode is enabled with the timer 23 matured, accelerator pedal 30 of FIG. 1 applied above a calibrated angle, and a speed of the vehicle 10 being above a threshold, for instance 35 KPH. A flag may be set in accordance with the state of trace F1, at which point in time the open-loop commanded output torque signal (trace $T_{CC}$) from the controller 50 follows a calculated optimal torque target (trace $T_{OT}$). This occurs starting at about t2, as trace $T_{OT}$ departs from the driver-requested torque (trace TR), pursues the commanded output torque signal (trace $T_{CC}$), and continues to do so until about t3.

At t3, without a change in the driver request torque (trace TR), a predetermined vehicle event may commence that causes a dynamic change to occur in the calculated optimal torque target (trace $T_{OT}$). Absent the method 100, the controller 50 would control the open-loop commanded output torque signal (trace $T_{CC}$) to pursue as closely as possible the optimal torque target (trace $T_{OT}$). Instead, the controller 50 executes the method 100 to prevent any dynamic movement of the output torque (arrow $T_O$) via control of the commanded output torque signal (trace $T_{CC}$).

This may be achieved by shaping the commanded output torque signal (trace $T_{CC}$) using a variable gain factor (K1) in response to detection of the predetermined vehicle event. The variable gain factor (K1) is a value in a range $R_{K1}$ of between 0 and 1 that is set by the controller 50 to achieve a desired torque response, i.e., a "shaping" of the output torque signal (trace $T_{CC}$). This allows the actual output torque (arrow $T_O$) to temporarily deviate from the calculated optimal torque target (trace $T_{OT}$), which occurs at t3 in FIG. 2, i.e., by applying a gain factor K1 of 0 to open-loop controls. K1 may be set to 1, for example, to allow the output torque signal (trace $T_{CC}$) to closely match the calculated optimal torque target (trace $T_{OT}$), and to 0 to ensure that the open-loop output torque signal (trace $T_{CC}$) does not pursue the calculated optimal torque target (trace $T_{OT}$).

The time plot of FIG. 3 depicts traces 70 describing shaping of the output torque signal (trace $T_{CC}$) in a manner that includes preventing the output torque signal (trace $T_{CC}$) from changing in a direction opposite to a direction of the steady-state torque request. Traces 70 describe a light tip-in at t1 and active fuel management transition at t3. From t1 to t3 the vehicle 10 operates in a fuel economy mode, e.g., with four of eight possible cylinders activated. During this mode, trace $S_{30}$ describes a slight increase or tip-in of the accelerator pedal 30 of FIG. 1, which causes a resultant rise in torque request (trace TR). As with FIG. 2, trace $T_{CC}$ is the open-loop output torque command, and trace $T_{OT}$ is the calculated optimal torque target.

When the torque request (trace TR) rises slightly at t1, the timer 23 may not drop quickly, and therefore the fuel economy mode is sustained. However, the optimal torque target (trace $T_{OT}$) can drop because the controller 50 assumes the engine 12 will increase in speed. Due to the ongoing fuel economy mode, however, the open-loop output torque signal (trace $T_{CC}$) can move in the opposite direction as the torque request (trace TR), as indicated at t2 by trace Δ. The controller 50, via the method 100, functions so as prevent this result.

In this instance, the variable gain factor (K1) is a calibration based on the difference between the driver's requested torque (TR) and the previous value of the torque command (arrow $T_{CC}$), as indicated graphically by trace Δ. Thus, as trace Δ rises, the controller 50 may begin to vary the gain factor (K1) as a calibrated function of the magnitude of the value of the difference (trace Δ). The result in FIG. 2 is that by operation of the variable gain factor K1, trace $T_{CC}$ does not pursue the optimal torque target (trace $T_{OT}$) as would ordinarily occur absent method 100.

Another example predetermined vehicle event in the form of an active fuel management (AFM) event occurs in FIG. 3 at t3. The increase in trace F2 at t3 indicates an increase in the number of active cylinders, e.g., from four cylinders 12C at t1 to eight cylinders 12C at t3 and thereafter. In this situation, the controller 50 assumes a higher torque contribution from the engine 12 due to the increased number of active or fueled cylinders 12C. The control effect at t3 is the same. That is, the controller 50 shapes the output torque signal ($T_{CC}$) via the variable gain factor K1 to prevent output torque signal ($T_{CC}$) from changing in a direction opposite to that of the steady-state torque request (trace TR), i.e., selectively prevents the pursuit of the calculated optimal output torque target (trace $T_{OT}$).

Figure 4:
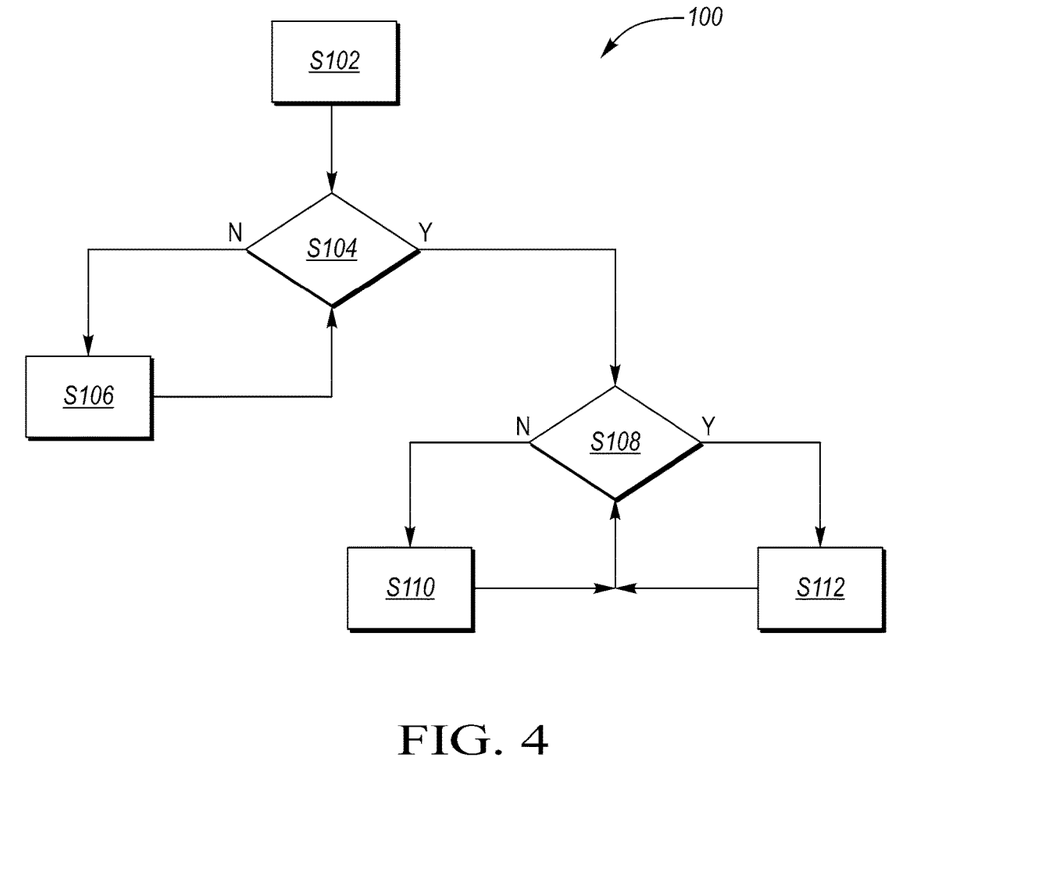
FIG. 4 is a schematic flow chart describing a method for controlling the powertrain of FIG. 1 during a predetermined vehicle event according to a calculated torque target.

Referring to FIG. 4, an example embodiment of the method 100 begins with step S102, wherein the controller 50 of FIG. 1 detects or otherwise determines a set of conditions of the vehicle 10. Conditions may include the position of a pedal signal (arrow $S_{30}$) from an accelerator pedal 30 of FIG. 1, the driver torque request, transmission state, vehicle speed, or other factors. Step S102 includes calculating, via the controller 50, an optimal torque target (trace $T_{OT}$ of FIGS. 2 and 3) for the powertrain 11 as a function of system limits of the vehicle 10, such as battery power limits and/or power or torque limits on the engine 12 and/or electric machine(s) 18. The method 100 then proceeds to step S104.

At step S104, the controller 50 determines, using the conditions from step S102, whether a steady-state torque request condition is present. Step S104 may be conducted using the timer 23, e.g., a quiescence timer operable for evaluating whether torque request is unchanged or sufficiently steady-state. If a steady-state torque request condition is not present, the method 100 proceeds to step S106. Otherwise, the method 100 proceeds to step S108.

Step S106 includes controlling the powertrain 11, via the output torque signal (arrow $T_{CC}$ of FIG. 1), according to the driver torque request while remaining within allowable limits for the engine 12, electric machine 18, and energy storage system 22. The method 100 returns to step S104, executing steps S104 and S106 in a loop until a decision is made at step S104 that a steady-state torque request condition is not present, at which point step S108 is executed.

At step S108, the controller 50 detects a predetermined vehicle event during the steady-state torque request condition. If a predetermined vehicle event is present of any of the types described above, e.g., selective cylinder deactivation, activation or deactivation of turbocharger 25, on/off cycling or other changes in the accessory power loads 27, etc. The method 100 proceeds to step S112. Step S110 is executed in the alternative if a predetermined vehicle event is not detected during the steady-state torque request condition.

At step S110, the controller 50 applies a variable gain factor K1 of 1 to shape the output torque signal (arrow $T_{CC}$ of FIG. 1) such that the output torque signal closely pursues the calculated output torque target (trace $T_{OT}$) of FIGS. 2 and 3, then repeats steps S108 and S110 in a loop until a predetermined vehicle event is detected at step S108.

Step S112 includes shaping the output torque signal (arrow $T_{CC}$) via the controller 50 using variable gain factor K1 in response to detection of the predetermined vehicle event at step S108. This allows the actual output torque (arrow $T_O$), via the shaping of the output torque signal (arrow $T_{CC}$ of FIG. 1), to temporarily deviate from the calculated output torque target (trace $T_{OT}$) of step S102. As explained above with reference to FIG. 3, shaping in step S112 may include reducing the variable gain factor K1 from 1 toward 0, with the level of reduction depending on the difference between the driver's requested torque and the previous value of the commanded output torque signal (arrow $T_{CC}$), as indicated graphically by trace Δ in FIG. 3.

While the best modes for carrying out the disclosure have been described in detail, those familiar with the art to which the disclosure relates will recognize various alternative designs and embodiments that fall within the scope of the appended claims. It is intended that all matter contained in the above description or shown in the accompanying drawings shall be interpreted as illustrative only and not as limiting.

The invention claimed is:

1. A method for controlling a powertrain of a vehicle, comprising:
   calculating, via a controller, an optimal torque target for the powertrain as a function of system limits of the vehicle;
   commanding, via transmission of an output torque signal by the controller, an actual output torque of the powertrain to pursue or follow the calculated optimal torque target during a steady-state torque request condition;
   detecting a predetermined vehicle event via the controller during the steady-state torque request condition; and
   shaping the output torque signal via the controller using a variable gain factor in response to detection of the predetermined vehicle event to allow the output torque signal, and thus the actual output torque of the transmission, to temporarily deviate from the calculated optimal torque target during the steady-state torque request condition.

2. The method of claim 1, wherein the powertrain is a hybrid electric powertrain having an energy storage system, and wherein the system limits include an electrical power limit of the energy storage system.

3. The method of claim 1, wherein shaping the output torque signal includes preventing the output torque signal from changing in a direction opposite to a direction of the steady-state torque request.

4. The method of claim 1, wherein the predetermined vehicle event is an active fuel management event.

5. The method of claim 4, wherein the active fuel management event includes a selective deactivation of one or more cylinders of an engine of the vehicle.

6. The method of claim 1, wherein the vehicle includes an engine with a turbocharger, and wherein the predetermined vehicle event is an activation or deactivation of the turbocharger.

7. The method of claim 1, wherein the predetermined vehicle event is a threshold increase in a power load of the vehicle.

8. The method of claim 1, wherein the powertrain is a hybrid powertrain having an engine and an energy storage system with a state of charge, and wherein calculating an optimal torque target includes determining the optimal torque target as a function of an optimal power level of the engine and energy storage system.

9. A powertrain comprising:
   a torque generating device having a calibrated power limit; and
   a controller in communication with the torque generating device that is programmed to:
      calculate an optimal torque target for the powertrain as a function of system limits of the powertrain, wherein the system limits include the calibrated power limit;
      command, via transmission of an output torque signal, an actual output torque of the powertrain to pursue or follow the calculated optimal torque target during a steady-state torque request condition;
      detect a predetermined vehicle event during the steady-state torque request condition; and
      shape the output torque signal using a variable gain factor in response to detection of the predetermined vehicle event to allow the output torque signal to temporarily deviate from the calculated optimal torque target during the steady-state torque request condition.

10. The powertrain of claim 9, wherein the torque generating device includes an electric machine, the powertrain further comprising: an energy storage system that is electrically connected to the electric machine, and that has a calibrated electrical power limit as the calibrated power limit.

11. The powertrain of claim 9, wherein the controller is programmed to shape the output torque signal by preventing the output torque signal from changing in a direction opposite to a direction of the steady-state torque request.

12. The powertrain of claim 9, wherein the predetermined vehicle event is an active fuel management event.

13. The powertrain of claim 12, wherein the torque generating device includes an engine having cylinders, and wherein the active fuel management event includes a selective deactivation of one or more of the cylinders.

14. The powertrain of claim 9, wherein the torque generating device includes an engine having a turbocharger, and wherein the predetermined vehicle event is an activation or deactivation of the turbocharger.

15. The powertrain of claim 9, wherein the predetermined vehicle event is a threshold increase in an electrical power load of the vehicle.

16. The powertrain of claim 9, wherein the torque generating device includes an engine, further comprising an energy storage system having a state of charge, and wherein the controller is configured to calculate the optimal torque target as a function of an optimal power level of each of the engine and the energy storage system.

* * * * *